June 24, 1930.　　　G. E. LYNCH　　　1,766,221

AIR AND GAS FILTER

Filed Feb. 15, 1927

INVENTOR.
George E Lynch
BY
ATTORNEYS.

Patented June 24, 1930

1,766,221

UNITED STATES PATENT OFFICE

GEORGE E. LYNCH, OF LOS ANGELES, CALIFORNIA

AIR AND GAS FILTER

Application filed February 15, 1927. Serial No. 168,301.

My invention relates particularly to that type of air or gas filters which use a filter medium composed of separate solid bodies forming a granular bed through which the gases pass. These filters depend for their effect upon frequent changes of direction of the gas current with impact upon and consequent adherence of the entrained dust to the surfaces of the bodies forming the filter bed. In the types of filters heretofore used the bed or body of filter medium is comparatively thin in order to reduce the frictional resistance to the rapid passage of the gas current, and the path of the gases is more or less at right angles to the direction of flow of the filter medium in those which are capable of such flow.

Among the objects of my invention are to provide a more simple and a more efficient filter and one which can be constructed and operated more economically than those heretofore developed.

I have established that successful results can be obtained by using a thick bed of the filter material, passing the gasses through this bed at a very slow speed, and causing the gases to emerge from the bed in a direction approximately opposite to the direction of flow of the medium when drawn off. I have also found it useful to allow part of the movable filter medium to cover the bottom surface or floor of the inlet duct or chamber of the filter so that the heavier particles carried by the current are deposited directly upon this material without passing into the interior of the bed. Simplicity of construction and operation are gained by forming the upper surfaces of the filter bed on a slope equal to the natural angle of repose of the filter material used, since this permits of the elimination of louvres or screens to confine the material In order to more fully illustrate my invention, I have shown on the accompanying sheet of drawings one practical embodiment therof, which I will now describe.

The embodiment of my invention here illustrated for explanatory purposes is designed for handling gases in very large volume and at high temperatures, but it will be understood that the invention is capable of embodiment in smaller apparatus. The construction here is of brick or concrete, but similar constructions may be of metal when the nature of the gas permits.

Figure 1:
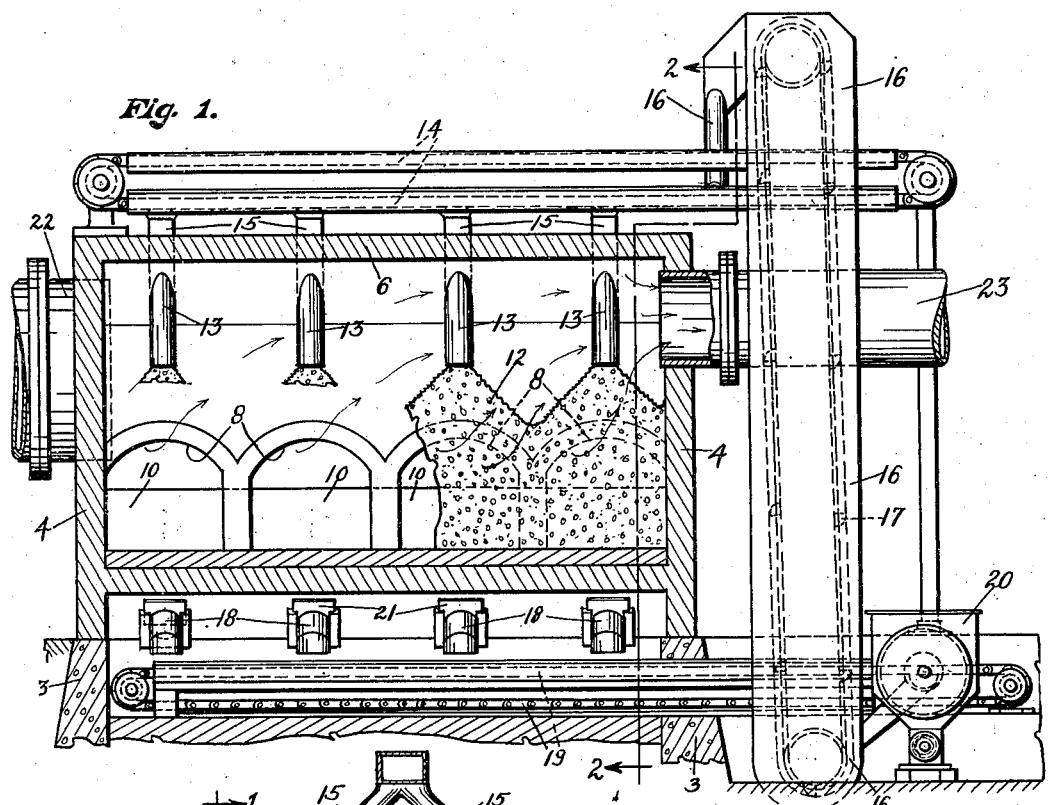
Figure 1 is a vertical, longitudinal sectional view of a filter embodying my invention, with parts shown in elevation.
Figure 2:
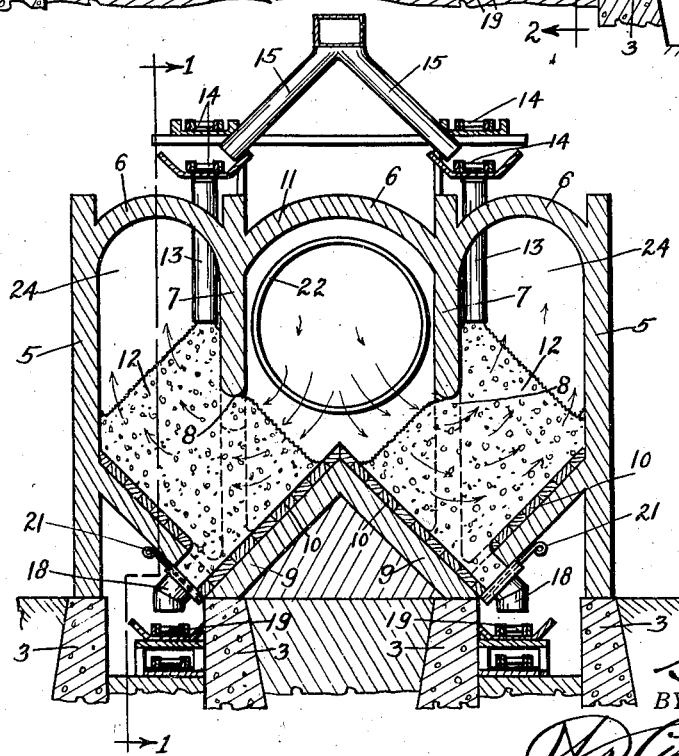
Figure 2 is a vertical, cross sectional view taken on line 2—2 of Fig. 1.

The general structure is of rectangular form having the base, 3, the end walls, 4, 4, the side walls, 5, 5, and the top 6, with the partition walls, 7, 7, having formed therein arch openings, 8, 8. The floor construction is in the form of two V-shaped portions extending longitudinally of the structure and designated, 9, 9, covered with brick, 10, 10, or other suitable covering. Referring to Fig. 2, it will be seen that the apex of said floor structure is in the middle chamber, designated 11, while the troughs formed are below the partition walls, 7, 7.

The filter material, 12, is fed into the structure through a series of vertical chutes, 13, 13, open at their upper ends and connected with conveyors, 14, 14, of the endless type, and to which endless conveyors the material is fed through chutes, 15, 15, as it is received from an elevator, 16, having therein an endless bucket conveyor, 17, of any suitable type. Said filter material is thus maintained in piles.

Said filter material, 12, is discharged or flows out through outlets, 18, 18, from the trough portions of the floor, 9, as clearly indicated, and is picked up by endless conveyors, 19, 19, and carried to and discharged into a rattler or cleaner, 20, from which it is again discharged into the elevator, 16, and lifted to the upper horizontal conveyors, 14, 14, and again fed through the chutes, 15, 15, and 13, 13, to the chambers in the structure. Gates, 21, 21, are provided for letting the filter material out through the outlets at 18, 18.

The gases to be filtered are fed into the chambers through a main inlet pipe, 22, at one end of the structure, and escape through an outlet pipe, 23, from the opposite end of the structure, and from the side chambers, there being two outlet pipes, but only one of which is seen in the drawings.

As the filter material is fed into the two side chambers, designated 24, 24, it assumes the position indicated, 12, 12, being the natural angles of repose, running through the open arches, 8, 8, and banking on the opposite sides of the middle portion of the floor, directly under the middle chamber and the inlet pipe 22, as will be clear from Fig. 2.

The operation of the apparatus may be briefly described as follows: The gases to be filtered are fed into the structure through the pipe 22. The heavier dust or foreign matters falls on the surface of the filter bed and is drawn off with the filter medium. The gases are drawn through the filter beds under the partition members, 7, 7, through the arch openings filled with the filter material and emerge from this bed of filter material in a vertical direction, approximately opposite to the direction of movement of said filter material when being drawn off, which insures that a surface of cleaned filter material is always present at the point of emergence of the gases.

An important feature of my invention is that the areas and volumes of filter bed and gas ducts and chambers must be such that the gases do not attain a speed higher than ten lineal feet per second while passing through the bed, and the bed of filter material must have a thickness many times greater than the average diameter of the separate bodies forming the filter medium.

So far as I am aware, I am the first to put into use a filter bed of comparatively great thickness, with a gravity flow and a slope of the natural angle of respose, with the gases to be filtered moving through said bed at a slow movement and discharging vertically through the filter bed and in a direction approximately opposite to the direction of flow of said filter material.

While I have shown and described one practical and successful embodiment of my invention, I am aware that changes in the construction and arrangement can be made without departing from the spirit thereof, and I do not limit my invention to the showing made, except as I may be limited by the hereto appended claims.

I claim:

1. In a filtering apparatus, a housing having vertical partitions dividing said housing into separate chambers, openings through said partitions at the floor, feeding means for maintaining a pile of loose filter material in said housing and filling the openings through said partitions, the opposite sides of said pile of filter material resting in inclines corresponding to the natural angles of repose at opposite sides of said partitions, means for inlet and outlet from opposite sides of said partitions, said means being adapted to be connected with means for causing a difference in pressure in said chambers, whereby gas to be filtered is caused to pass downwardly through one side of said pile and upwardly through the material in the openings in said partition and into the chambers at the opposite sides of said partitions, and means for drawing off said filter material from the bottom, whereby to keep it moving gradually downwardly along its inclined upper surfaces at opposite sides of said partitions.

2. A filter apparatus comprising a housing with two partitions therein dividing it into three chambers, said partitions having arched openings therethrough at the floor, inclined floors, feeding means for maintaining piles of loose filter material in the two outside chambers, said piles having their inclined surfaces filling and extending through said openings in said partitions, means for drawing off said material at the lower sides of said piles, whereby to keep the body of material moving downwardly, inlet means to the central chamber, outlet means from the outside chambers, said inlet and outlet means being adapted to be connected for causing a difference in pressure between the outer chambers and the central chamber, whereby to cause gas to be filtered to pass downwardly through said pile of material and upwardly to the opposite side.

3. In a filtering apparatus, a housing having its floor inclined downwardly and upwardly in saw-tooth fashion, with outlet means in the lower angle, a vertical partition above said floor with arched openings therethrough at the floor dividing said housing into chambers, means for feeding a loose filter material into the housing to fill the angle in said floor and to fill the arched openings through said partition, means for transferring said material from the outlet means through the floor to the feeding means for maintaining said filter material in a pile filling said arched opening, inlet means for supplying gas to be filtered to one chamber, outlet means for filtered gas from another chamber, said apparatus being adapted to be connected to means for causing a difference in pressure between said chambers, whereby gas entering the inlet means is caused to pass downwardly through the filter material, through said arched openings and upwardly through said filter material to the outlet means in filtered form.

Signed at Los Angeles, Los Angeles County, California, this 8th day of February, 1927.

GEORGE E. LYNCH.